UNITED STATES PATENT OFFICE.

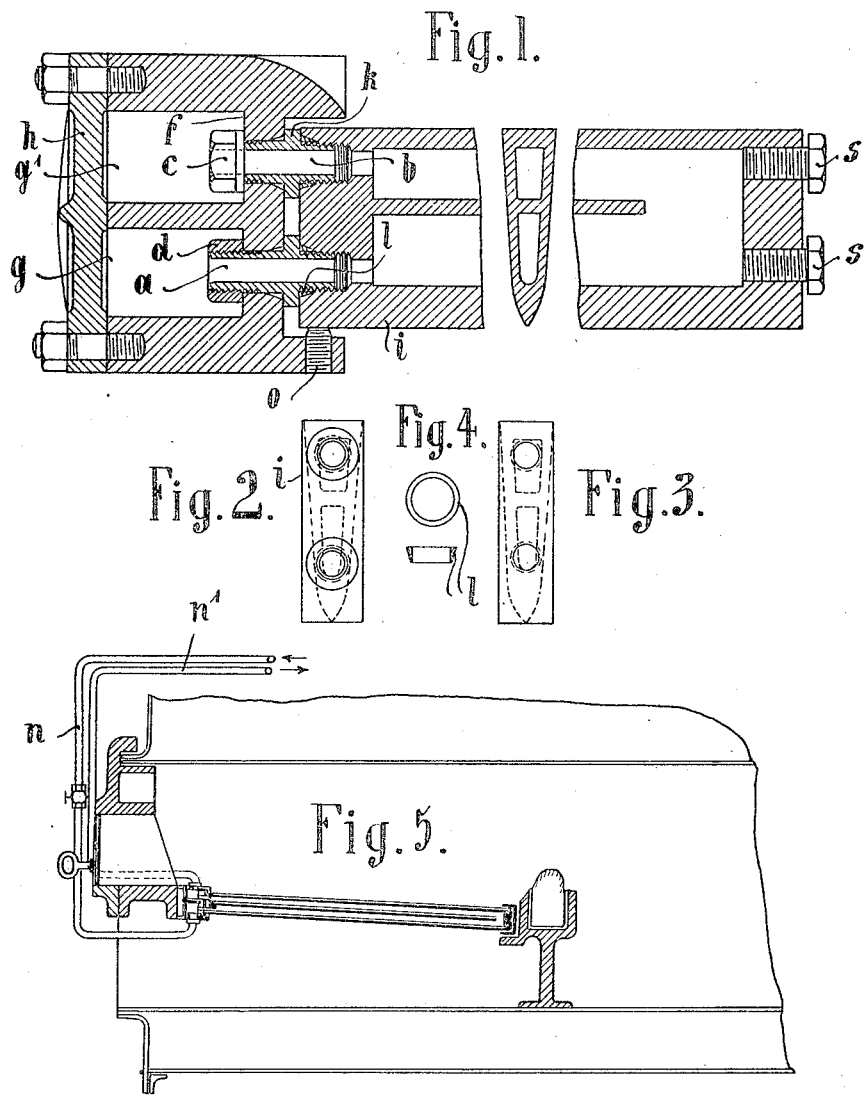

ROBERT GRABOWSKY, OF HANOVER, GERMANY.

WATER-COOLED FIRE-BAR.

1,107,291. Specification of Letters Patent. Patented Aug. 18, 1914.

Application filed September 4, 1912. Serial No. 718,457.

*To all whom it may concern:*

Be it known that I, ROBERT GRABOWSKY, a subject of the Emperor of Germany, residing at 11 Harnischstrasse, Hanover, Germany, have invented certain new and useful Improvements Relating to Water-Cooled Fire-Bars, of which the following is a specification.

This invention relates to water cooled fire-bars in which the inlet and outlet for the cooling liquid are arranged adjacent to one another at one end of the fire-bar, and has for its object to provide improved arrangements for connecting and supporting the fire-bars so as to avoid leakage of the cooling liquid during operation and which will be simple in construction, cheap to manufacture, and, above all, efficient in operation and readily accessible for inspection and cleansing purposes.

The connection between the hollow fire-bars and the water chamber from which they are supplied with cooling liquid is effected as is usual by means of tubular connecting members, and according to the present invention an external flange formed on each of these tubular members is arranged to engage on either side with packing rings or washers so as to force the latter into intimate contact with corresponding packing surfaces on the water chamber and fire-bar respectively, the fire-bar being supported and its weight carried by means of adjustable supporting screws mounted in the casing of the water chamber.

The invention is illustrated in the accompanying drawings of which—

Figure 1 is a view in sectional side elevation of a fire-bar connected to the water chamber from which it is supplied with cooling liquid in accordance with the invention; Figs. 2 and 3 are views in elevation of the front and rear ends of the fire-bar shown in Fig. 1; Fig. 4 illustrates in plan and sectional elevation one of the packing rings employed in constructing the joint between the fire-bar and the water chamber, and Fig. 5 is a general view of a furnace provided with fire-bars supported and arranged in accordance with the invention.

Referring now to the drawings, the water chamber above referred to comprises an inlet chamber $g$ and an outlet chamber $g^1$ the chambers $g$ and $g^1$ being in communication with inlet and outlet pipes $n$ and $n^1$ respectively as shown in Fig. 5, and being also provided with a common detachable cover indicated at $h$. The connection between the interior of the tubular fire-bar and the chambers $g$ and $g^1$ is effected by means of tubular connecting members $a$ and $b$, one end of each of which is screwed into the head portion $i$ of the fire-bar which is welded or otherwise secured to the body of the latter, the opposite end of each of the tubular connecting members $a$ and $b$ passing through an aperture in the inner wall $f$ of the water chambers $g$ and $g^1$ and being secured on the inner side of the wall $f$ by means of nuts indicated at $c$ and $d$. Each of the tubular connecting members $a$ $b$ is provided with a flange $k$ intermediate its length, suitable packing rings or washers $l$ being interposed between the flange $k$ and corresponding packing surfaces formed on the wall $f$ of the water chamber and the head portion $i$ of the fire-bar for the purpose of preventing leakage.

The operation of connecting the fire-bars to the water chamber is as follows: The tubular members $a$ and $b$ are first secured in the head portion $i$ of the fire-bar after placing the right-hand packing ring $l$ in position on the head portion $i$ of the fire-bar, and in order to facilitate this the flanges $k$ are preferably of hexagonal form so that the tubular connecting portions $a$, $b$ may be screwed into position by means of a spanner or in any other suitable manner. The other packing ring $l$ is then placed in position surrounding each of the tubular connecting members $a$, $b$ and the free ends of these members are then passed through the corresponding apertures in the wall $f$ of the water chambers after which the nuts $c$ and $d$ are placed in position and screwed on to the tubular members $a$ and $b$ respectively so as to effect a tight joint between the fire-bar and the water chambers $g$, $g^1$. The detachable cover $h$ of the water chamber is then placed in position and secured by means of bolts.

It will be understood from the above description that the flange $k$ serves to effect intimate contact between both the packing rings $l$ on either side of the flange and the corresponding packing surfaces in the wall $f$ of the water chambers and the head portion $i$ of the fire-bar so as to prevent any possibility of leakage of the cooling fluid. The fire-bar is as shown in Fig. 1 preferably provided with apertures at the end opposite to the head portion $i$ which are normally closed by means of removable plugs *s* so that when the plugs *s* and the cover *h* of the water chambers are removed an uninterrupted view through the upper and lower portions of the fire-bar and the water chambers can be obtained for the purpose of inspection. The fire-bars as thus assembled are preferably arranged in the furnace as shown in Fig. 5, the rear end of each fire-bar being supported on a projection formed or secured to the bridge or arch of the furnace, the water chamber being suitably supported at the front of the furnace in any suitable way.

In order to prevent the weight of the front end of the fire-bar being carried by the tubular supporting members *a*, *b* an adjustable screw or projection *o* indicated in Fig. 1 is provided so as to insure that the weight of the fire-bar will be carried on the water chamber, in a flange of which the adjusting screw *o* is mounted.

Various modifications in the constructional details above described may evidently be effected without exceeding the scope of the invention.

What I claim is:—

In combination, a fire-bar having a passage formed therein through which a cooling liquid is adapted to flow, said bar being provided at one of its ends with inlet and outlet openings communicating with said passage, a water chamber said chamber being provided with a flange extending under said fire-bar and a support adjustably mounted on said flange and engaging said fire-bar, and hollow connecting members between said chamber and said passage, said members extending in the direction of the length of said fire-bar.

In testimony whereof I have hereunto set my hand in presence of two subscribing witnesses.

ROBERT GRABOWSKY.

Witnesses:
  T. HENDY REED,
  MARVIN KÖPHER.

Copies of this patent may be obtained for five cents each, by addressing the "Commissioner of Patents, Washington, D. C."